(12) United States Patent
Daley (10) Patent No.: US 10,822,822 B2
(45) Date of Patent: Nov. 3, 2020

(54) SURFACE CONCEALMENT SYSTEM

(71) Applicant: Daniel Logan Daley, Fort Collins, CO (US)

(72) Inventor: Daniel Logan Daley, Fort Collins, CO (US)

( * ) Notice: Subject to any disclaimer, the term of this patent is extended or adjusted under 35 U.S.C. 154(b) by 80 days.

(21) Appl. No.: 16/133,615

(22) Filed: Sep. 17, 2018

(65) Prior Publication Data

US 2020/0087937 A1  Mar. 19, 2020

(51) Int. Cl.
| | |
|---|---|
| *E04G 23/02* | (2006.01) |
| *B32B 5/26* | (2006.01) |
| *B32B 3/02* | (2006.01) |
| *B32B 7/12* | (2006.01) |
| *B32B 29/00* | (2006.01) |
| *B32B 25/06* | (2006.01) |
| *B32B 5/02* | (2006.01) |

(52) U.S. Cl.
CPC ............ *E04G 23/0214* (2013.01); *B32B 3/02* (2013.01); *B32B 5/028* (2013.01); *B32B 5/26* (2013.01); *B32B 7/12* (2013.01); *B32B 25/06* (2013.01); *B32B 29/005* (2013.01); *B32B 2307/718* (2013.01); *B32B 2556/00* (2013.01)

(58) Field of Classification Search
CPC .. B32B 3/02; B32B 5/028; B32B 5/26; B32B 7/12; B32B 25/06; B32B 29/005; B32B 2307/718; B32B 2556/00; Y10T 428/14; Y10T 428/28; E04G 23/0214
See application file for complete search history.

(56) References Cited

U.S. PATENT DOCUMENTS

| | | | | |
|---|---|---|---|---|
| 4,135,017 | A | * | 1/1979 | Hoffmann, Sr. ........ B29C 73/00 156/94 |
| 4,358,495 | A | * | 11/1982 | Parker ..................... E04G 23/02 428/64.1 |
| 4,959,251 | A | | 9/1990 | Owens et al. |
| 5,620,768 | A | * | 4/1997 | Hoffmann, Sr. ........ B29C 73/10 428/77 |
| 5,839,241 | A | | 11/1998 | Cacossa et al. |
| 5,974,746 | A | | 11/1999 | Mathias |
| 7,971,405 | B2 | * | 7/2011 | Hansen ................... E04F 13/04 52/514 |
| 8,381,474 | B2 | * | 2/2013 | Lewis ................. E04G 23/0207 52/514 |

* cited by examiner

*Primary Examiner* — Patricia L. Nordmeyer
(74) *Attorney, Agent, or Firm* — Craig R. Miles; CR MILES P.C.

(57) ABSTRACT

A multi-layered surface indentation concealment system having a body including a medial portion and a flexible peripheral margin extending outward of said medial portion. The body can be disposed to conceal a surface indentation in a surface, whereby the medial portion spans the surface indentation and the flexible peripheral margin secures about the surface indentation by application of a coat composition to the flexible peripheral margin.

27 Claims, 5 Drawing Sheets

SURFACE CONCEALMENT SYSTEM

FIELD OF THE INVENTION

A multi-layered surface indentation concealment system having a body including a medial portion and a flexible peripheral margin extending outward of said medial portion. The body can be disposed to conceal a surface indentation in a surface, whereby the medial portion spans the surface indentation and the flexible peripheral margin secures about the surface indentation by application of a coat composition to the flexible peripheral margin.

SUMMARY OF THE INVENTION

Accordingly, a broad object of the present invention can be to provide a surface indentation concealment system having a body including a flexible peripheral margin extending outward of a medial portion, the flexible margin flexible in relation to the medial portion and having a lesser thickness than the medial portion. In particular embodiments, the body can include an outer fiber layer including the flexible peripheral margin having a first thickness, and one or a plurality of inner fiber layers coupled to the outer fiber layer, the one or plurality of inner fiber layers having a second thickness greater than the first thickness of the outer fiber layer.

Another broad object of the present invention can be to provide a method for making a surface indentation concealment system including extending a peripheral margin of a body outward of a medial portion of the body, the flexible peripheral margin having a lesser thickness than the medial portion, the peripheral margin flexible in relation to the medial portion. In particular embodiments, extending a peripheral margin of a body outward of a medial portion of a body comprises coupling one or a plurality of inner fiber layers to an outer fiber layer, the outer fiber layer having a first thickness and the one or plurality of inner fiber layers having a second thickness greater than the first thickness of the outer fiber layer.

Another broad object of the present invention can be to provide a method for using a surface indentation concealment system including disposing a body to conceal a surface indentation on a surface, the body including a flexible peripheral margin extending outward of a medial portion, the flexible peripheral margin having a lesser thickness than the medial portion, the peripheral margin flexible in relation to the medial portion, flexing the flexible peripheral margin outward from the surface; applying a coat composition to the surface about the surface indentation, and engaging the flexible peripheral margin to the coat composition applied to the surface about the surface indentation.

Naturally, further objects of the invention are disclosed throughout other areas of the specification, drawings, photographs, and claims.

DETAILED DESCRIPTION OF THE INVENTION

Generally, referring to FIGS. 1 through 6, a multi-layered surface indentation concealment system (1) having a body (2) including a medial portion (3) and a flexible peripheral margin (4) extending outward of the medial portion (3). The flexible peripheral margin (4) flexible in relation to the medial portion (3) of the body (2) and having a lesser thickness (5) than the medial portion (3) extending outward of the medial portion (3).

Figure 1:
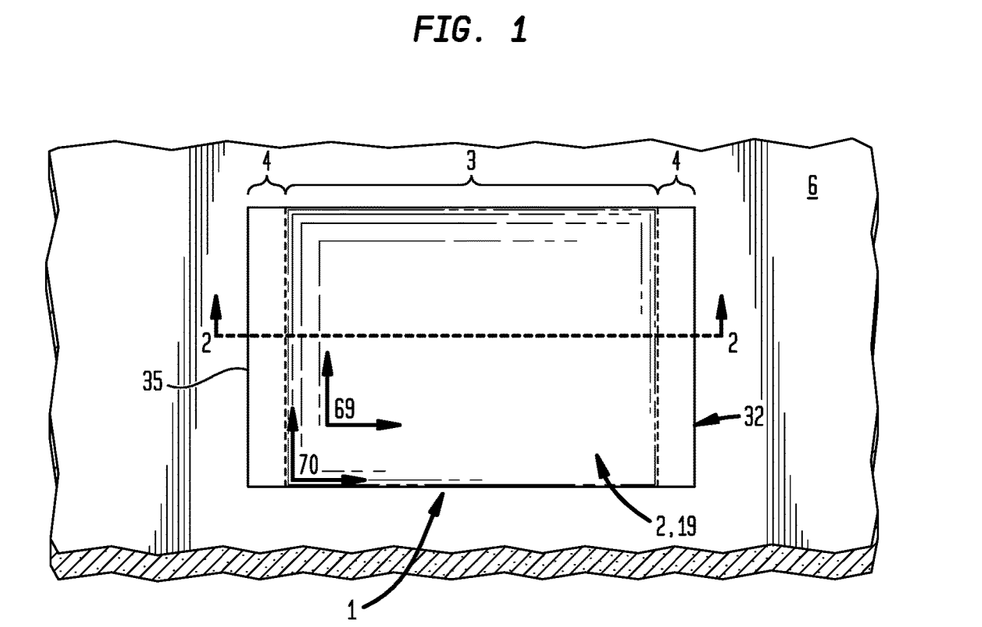
FIG. 1 is an illustration of a method of concealing a surface indentation using an embodiment of a multi-layered surface indentation concealment system.
Figure 2:
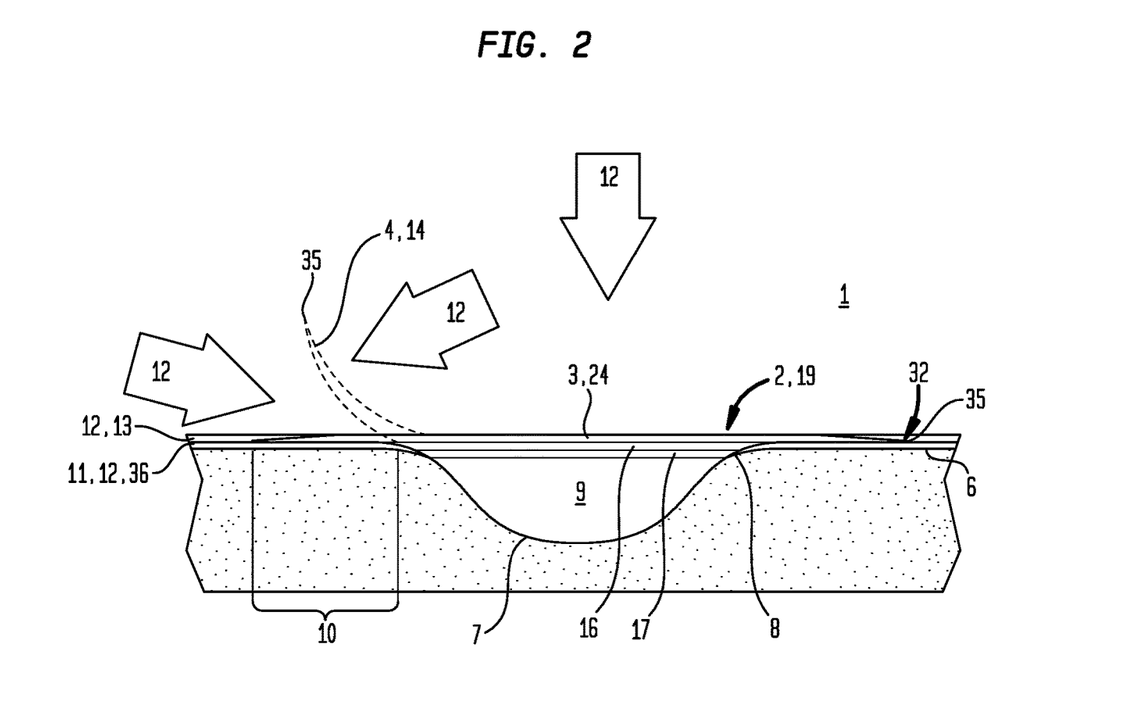
FIG. 2 is cross section view 2-2 shown in FIG. 1 which shows a medial portion of a body spanning a surface indentation and a flexible peripheral margin of a body flexed (shown in broken line) for application of a coat composition to the surface surrounding the surface indentation and peripheral margin secured to the surface about the surface indentation (shown in solid line) by the coat composition.
Figure 3:
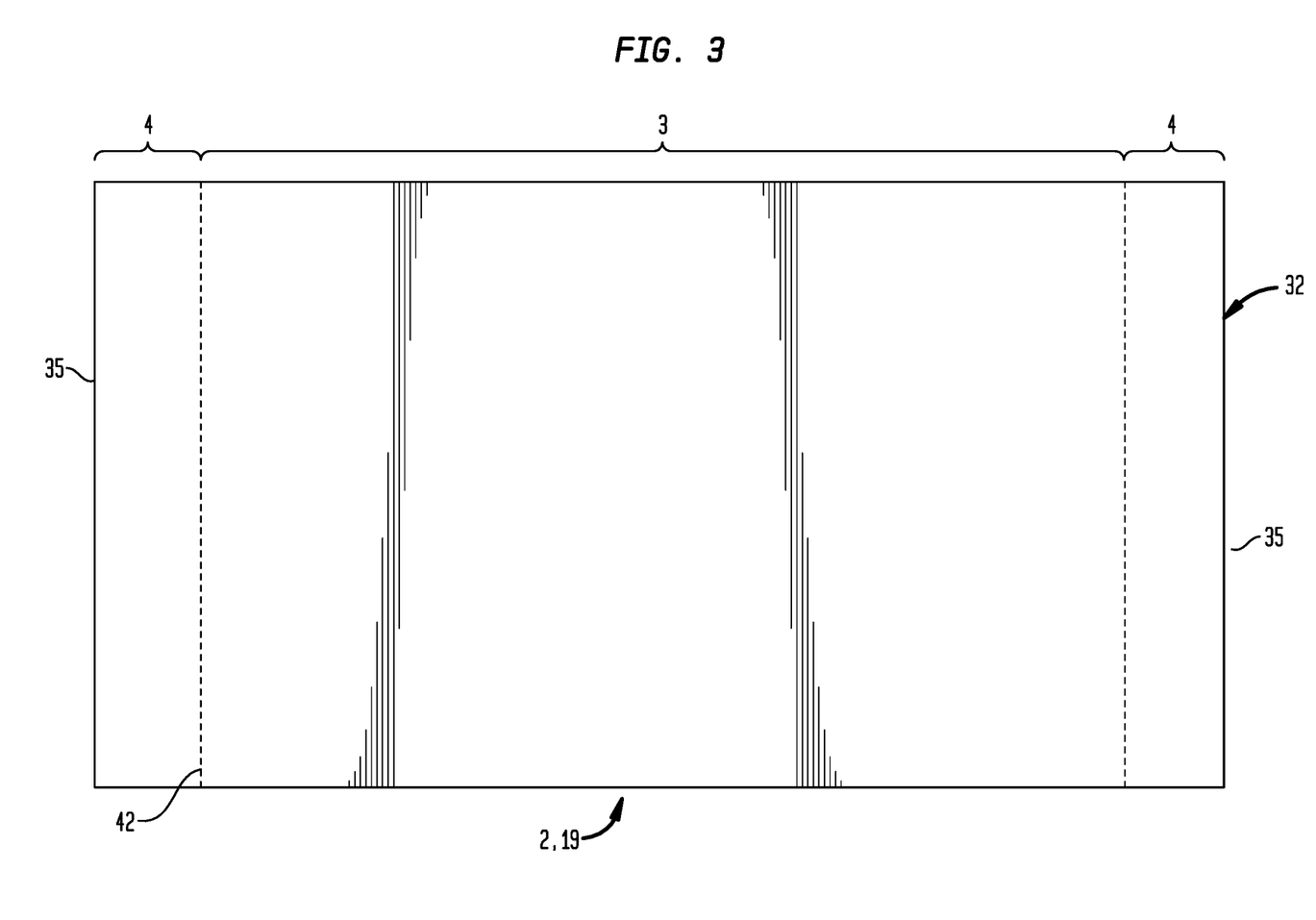
FIG. 3 is a top plan view of a particular embodiment of a multi-layered surface indentation concealment body.

Now referring primarily to FIGS. 1 and 2, particular methods of using embodiments of the body (2) can include disposing the body (2) on a surface (6). The surface (6) can, but need not necessarily, include a cavity (7) extending to a cavity rim (8). For the purposes of this invention the term "cavity" means an unfilled space, and without limitation to the breadth of the foregoing, an unfilled space can include as illustrative examples the gap between affixed wall panels, holes penetrating a wall panel, surface gouges, indentations, recesses, hollows, pockets, pouches, apertures, pits, or the like.

Again, referring to FIGS. 1 and 2, in particular methods of using embodiments, the medial portion (3) of the body (2) can be disposed over the cavity (7) with the flexible peripheral margin (4) disposed over the surface (6) around the cavity rim (8). In particular methods, the medial portion (3) can span or bridge the cavity (7) with the flexible peripheral margin (4) secured to the cavity rim (8) defining the cavity (7). In this manner, the body (2) spans the unfilled space (9) but does not necessarily fill the unfilled space (9) of the cavity (7). In particular embodiments, the medial portion (3) can fill a portion or all of the cavity (7). The flexible peripheral margin (4) can be flexed outward from the surface (6) (as shown the example of FIG. 2 in broken line). The portion (10) of the surface (6) located beneath the retracted flexible peripheral margin (4) can have a first layer (11) of coat composition (12) applied to the surface (6) around the cavity (7) or the surface (6) of the flexible peripheral margin (4) facing the surface (6), or both. The flexible peripheral margin (4) can be forcibly urged against the surface (6) with the first layer (11) of coat composition (12) disposed between the flexible peripheral margin (4) and the surface (6) around the cavity (7). Forcible urging can be applied to the flexible peripheral margin (4) by use of a hand or with a tool such as a squeegee, roller, sponge, trowel, knife, scraper, chisel, or other like tool which can be contacted to and moved across the flexible peripheral margin (4) engaged to the first layer (11) of coat composition (12) to promote adhesion of the flexible peripheral margin (4) to the coated surface (6) around the cavity (7). The first layer (11) of coat composition (12) can, but need not necessarily, be permitted to dry. In particular methods, a second layer (13) of coat composition (12) can be disposed on the outward facing surface (14) of the flexible peripheral margin (4) or body (2).

In further particular methods, the second layer (13) of coat composition (12) can extend outward a distance from the flexible peripheral margin (4) of the body (2). The second layer (13) of coat composition (12) can, but need not necessarily, be permitted to dry.

The term "coat composition" broadly includes any composition compatible with and which can be applied to the surface (6) having the cavity (7) and the body (2), which coat composition (12) permitted to dry secures the flexible peripheral margin (4) of the body (2) to the surface (6) to conceal the cavity (7) and without limitation to the breadth of the foregoing includes as illustrative examples one or more of: a preparatory coating to seal dry wall panels, primer as a preparatory coating before painting, acrylic primer, vinyl acrylic primer, enamel primer, vinyl acetate emulsion, latex paint, enamel paint, or like compositions. As an illustrative example, the first layer (11) of coat composition (12) can be a primer and the second layer (13) of coat composition (12) can be paint.

Now referring primarily to FIGS. 1 and 2, in particular embodiments in which the medial portion (3) of the body (2) further includes an adhesive layer (17), the method can further include forcible urging on the body (2), as above described, to adhere the adhesive layer (17) to the surface (6) to secure the medial portion (3) of the body (2) to span the cavity (7) in the surface (6) prior to application of the coat composition (12) to the surface (6) or to the flexible peripheral margin (4) to secure the flexible peripheral margin (4) to the surface (6). The adhesive layer (17) material can be selected from the group consisting of: latex-based adhesive, synthetic elastomeric polymer adhesive, polyvinyl acetate adhesive, or combinations thereof.

Figure 6:
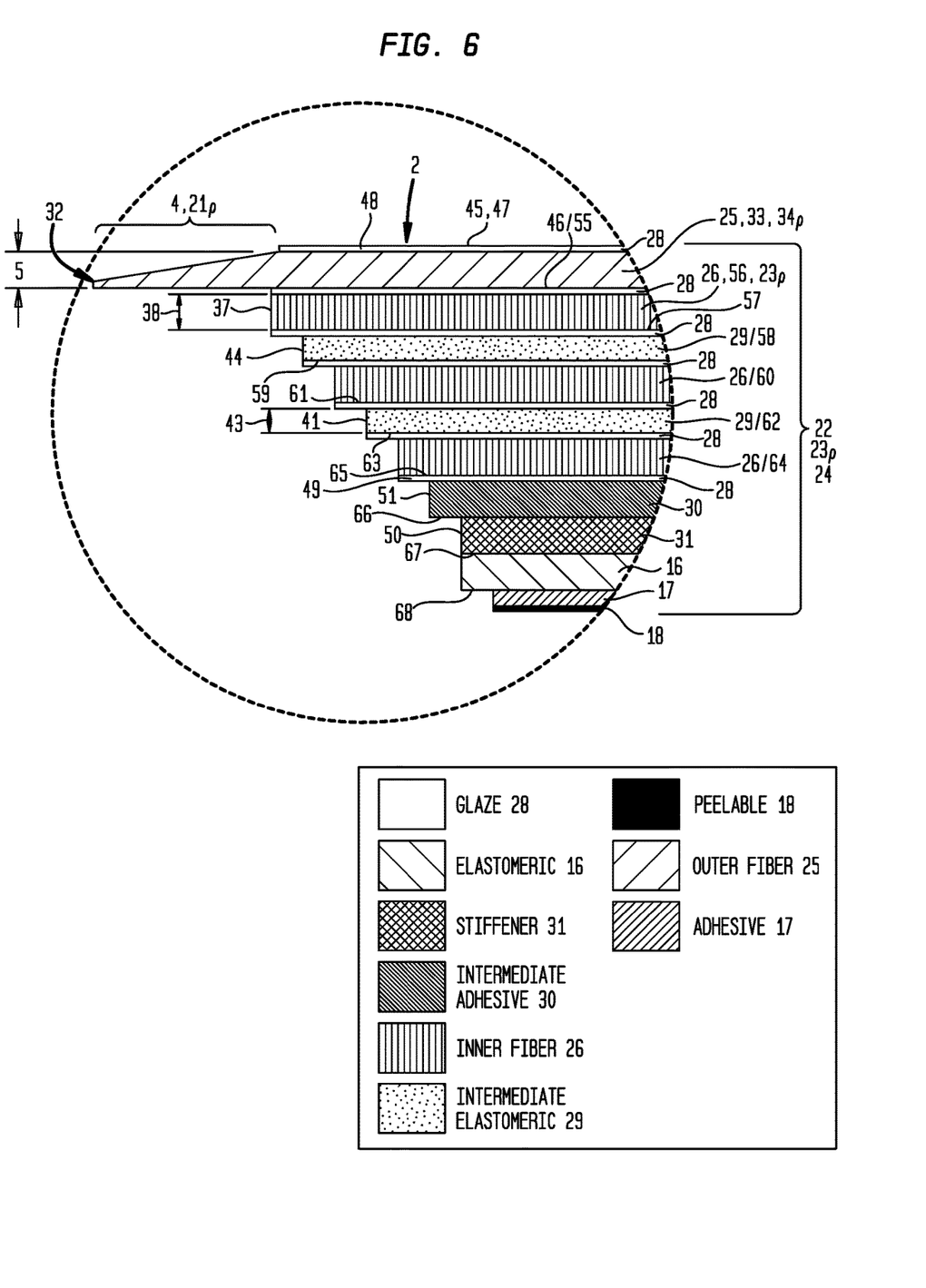
FIG. 6 is an enlarged portion of the side elevation view of FIG. 5 including key identifying each of the multiple layers of the surface indentation concealment body.

In particular embodiments, a peelable layer (18) (as shown in the example of FIG. 6) can be engaged to the adhesive layer (17). The peelable layer (18) can be peelably removed prior to engaging the body (2) over a cavity (7) in the surface (6).

Embodiments of the method can confer a substantial advantage in that the flexible peripheral margin (4) of the body (2) can be sufficiently thin that upon securement with a coat composition (12) to the surface (6) or by further application of the coat composition (12) over the flexible peripheral margin (4), the body (2) or the surface (6) may not require any further treatment to conceal the cavity (7) in the surface (6) or conceal the body (2) in relation to the surface (6). The surface (6) having the body (2) affixed by the method can further receive conventional texture or paint products.

In further particular embodiments, an elastomeric layer (16) can be disposed on the medial portion (3) of the body (2). The elastomeric layer (16) material can be selected from the group consisting of: natural rubber, resin, rubber cement, thermoplastic elastomers, nitrile rubber, silicone rubber, synthetic rubber, timprene, butyl rubber, and neoprene rubber, or combinations thereof.

Now referring primarily to FIGS. 3 through 6, in particular embodiments, the body (2) can comprise a one-piece body (19) including a medial portion (3) and a flexible peripheral margin (4) extending outward of the medial portion (3). The medial portion (3) can be sufficiently stiff to span a cavity (7) in a surface (6) and the flexible peripheral margin (4) can flex in relation to the medial portion (3) as above described to allow application of the coat composition (12) and securement of the flexible peripheral margin (4) to the surface (6). The flexible peripheral margin (4) can have a lesser thickness (5) or lesser density (21p) than the medial portion thickness (22) or medial portion density (23p).

Again, referring primarily to FIGS. 3 through 6, in particular embodiments, the body (2) can be produced as a plurality of layers (24). The plurality of layers (24) can include an outer fiber layer (25) inclusive of the flexible peripheral margin (4) and a plurality of inner fiber layers (26) inclusive of the medial portion (3). In particular embodiments, each successive one of the plurality of inner fiber layers (26) covers a lesser surface area (27) of the body (2), and can, but need not necessarily, further include one or more intermediate glaze layers (28), intermediate elastomeric layers (29), intermediate adhesive layers (30), and stiffener layers (31), or combinations thereof.

For the purposes of this invention, the term "fiber layer" means a sheet of pressed together fibers of cellulose pulp, and without limiting the breadth of the foregoing, as illustrative examples the cellulose pulp can be derived from one or more of wood, rags, or grasses, and combinations thereof.

The outer fiber layer (25) extends to an outer fiber layer periphery (32). The outer fiber layer periphery (32) can bound an area of any configuration, and with limitation to the breadth of the foregoing, as illustrative examples, an elongate strip which can take the form of a rolled condition or an unrolled condition, a sheet having an area which defines a square, a rectangle, a circle, a polygon, oval, or other geometric configurations, or combinations thereof.

The outer fiber layer (25) can be define a first thickness (33) or a first density (34), or combinations thereof, which permits the outer fiber layer (25) to be flexible in relation to a plurality of inner fiber layers (26) which in use remain substantially flat. In particular embodiments, the outer fiber layer (25) can comprise or consist of a first density (34) or grammage of about 5 g/m$^2$ to about 15 g/m$^2$ with particular embodiments having a first density (34) of about 8 g/m$^2$ to about 12 g/m$^2$ and with particular embodiments having a first density (34) of about 10 g/m$^2$. The first thickness (33) of the outer fiber layer (25) can be substantially consistent over the outer fiber layer (25) including the flexible peripheral margin (4), or the thickness (5) of the flexible peripheral margin (4) can taper approaching the flexible peripheral margin edge (35) (as shown in the illustrative example of FIG. 6). The first thickness (33) of the outer fiber layer (25) can vary in coordination with the type or kind of coat composition (12) applied. Useful first thicknesses (33) being substantially equal to the thickness (36) of the dried coat composition (12), thereby visually obscuring the flexible peripheral margin (4) of the body (2). As illustrative examples, a coat composition (12) of conventional primer upon drying can have a thickness of about 0.025 millimeter, a coat composition (12) of conventional latex paint upon drying can have a thickness of about 0.1 millimeter which can be coordinated with use of an outer fiber layer (25) having a substantially equivalent first thickness (33) at the flexible peripheral margin edge (35), thereby application of the coat composition (12) having a thickness (36) of about 0.1 millimeter ("mm") can visually obscure a flexible peripheral margin edge (35) of lesser thickness (5). Accordingly, the embodiments can have an outer fiber layer (25) having a first thickness (33) of about 0.012 mm to about 0.064 mm, which can be coordinated with the use of various coat compositions (12). As illustrative examples, the outer fiber layer (25) can, but need not necessarily, comprise or consist of: mulberry paper, rice paper, unsized rice paper, sized rice paper, tissue paper, or other like paper.

Again, referring primarily to FIGS. 3 through 6, in particular embodiments, the body (2) can further include one or a plurality of inner fiber layers (26). The inner fiber layers (26) can be successively coupled to the outer fiber layer (25).

The one or a plurality of inner fiber layers (26) can each have an inner fiber layer top surface and an inner fiber layer bottom surface extending to an inner fiber layer periphery (37). The one or more inner fiber layer peripheries (37) can, but need not necessarily, extend to the flexible peripheral margin (4) of the outer fiber layer (25). In particular embodiments, each successive one of the plurality of inner fiber layers (26) can cover a lesser surface area (27) of the body (2) as the inner fiber layers (26) stack upon the outer fiber layer (25).

The one or more inner fiber layers (26) can be defined by a second thickness (38) or a second density (39) or combinations thereof which permit the inner fiber layer (26) to be sufficiently stiff to remain substantially flat in spanning or bridging a cavity (7) in a surface (6). In particular embodiments, each inner fiber layer (26) can comprise or consist of a second density (38) or grammage of about 30 g/m² to about 50 g/m² with particular embodiments having a second density (39) of about 35 g/m² to about 45 g/m² and with particular embodiments having a second density (39) of about 40 g/m². The second thickness (38) of each of the inner fiber layers (26) can be substantially consistent adding to the overall thickness (40) of the medial portion (3) of the body (2) (as shown in the illustrative example of FIG. 5). Useful thicknesses (39) of each of the one or stacked inner fiber layers (26) allowing the medial portion (3) of the body (2) to span or bridge the cavity (7) in the surface (6) over which the body (2) can be placed can comprise or consist of a second thickness (38) of about 0.076 mm to about 1.27 mm. As illustrative examples, each inner fiber layer (26) can but need not necessarily comprise or consist of: mulberry paper, rice paper, unsized rice paper, sized rice paper, tissue paper, or other like paper.

Figure 5:
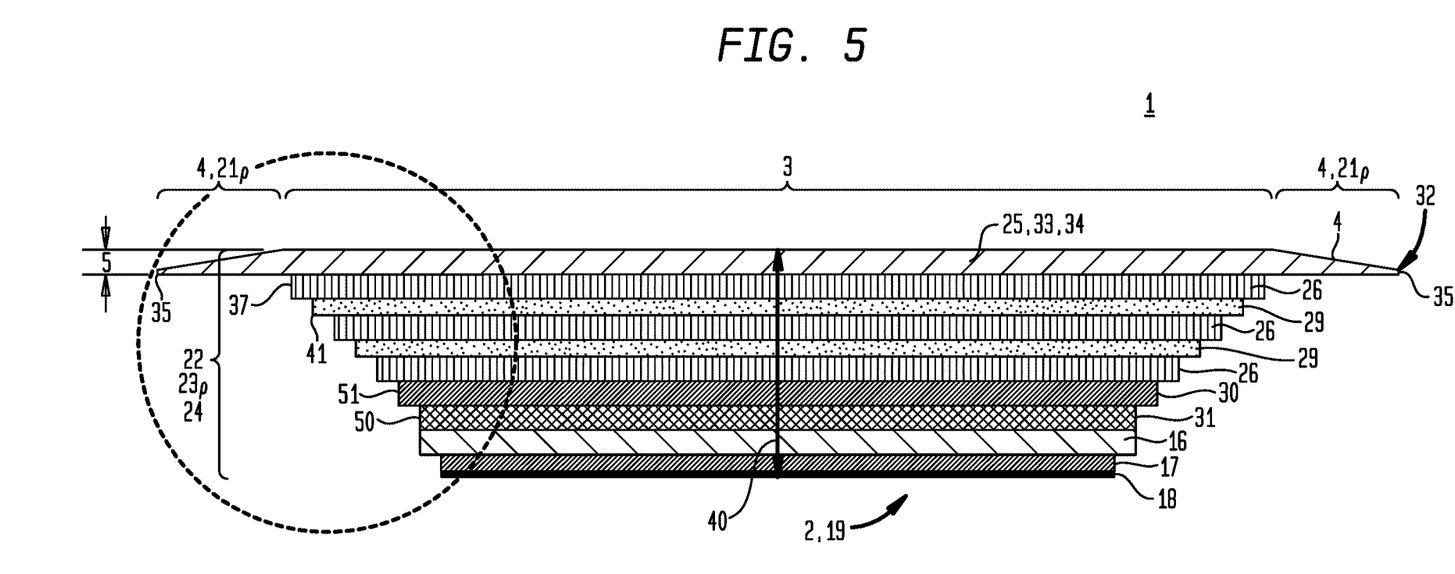
FIG. 5 is a side elevation view of a particular embodiment of a multi-layered surface indentation concealment body.

Now referring primarily to FIGS. 5 and 6, in particular embodiments, an intermediate elastomeric layer (29) can be disposed between one or more of the pairs of the plurality of inner fiber layers (26). The intermediate elastomeric layer (29) can extend to an intermediate elastomeric layer periphery (41). The intermediate elastomeric layer periphery (41) can, but need not necessarily, correspond to the inner fiber layer periphery (37) of one of the pair or the pair of the plurality of inner fiber layers (26). In further particular embodiments, the intermediate elastomeric layer periphery (41) can correspond to the medial portion peripheral margin (42). The intermediate elastomeric layer (29) can be function both to secure pairs of inner fiber layers (26) together with provision of sufficient flexure or movement between the plurality of inner fiber layers (26) to allow the body (2) to conform to the surface (6) having the cavity (7). While the Figures depict the intermediate elastomeric layer (29) as being generally the same thickness (43) as the plurality of inner fiber layers (26) for the purpose of identification, the intermediate elastomeric layers (29) can have a lesser thickness (43) than either of the plurality of inner fiber layers (26) and comprise a thin film (44) when applied by spray between pairs of inner fiber layers (26). The intermediate elastomeric layer (29) material can include or consist of: natural rubber, rubber cement, thermoplastic elastomers, nitrile rubber, silicone rubber, synthetic rubber, timprene, butyl rubber, and neoprene rubber, rubber coating such as LEAKSEAL®, product identifier 267453, available from Rust-oleum Corporation which includes hydrocarbon resins and naptha and xylene solvents, or combinations thereof.

Again, referring primarily to FIGS. 5 and 6, in particular embodiments, a glaze layer (28) can be disposed on opposed surfaces (45)(46) of the outer fiber layer (25) or each one or a plurality of the inner fiber layers (26). The glaze layer (28) can be disposed on the entirety of the exterior surface (47) of the outer fiber layer (25). In particular embodiments, the glaze layer (28) can extend to the outer fiber layer periphery (32). In further particular embodiments, the glaze layer (28) can extend over the medial portion (3) of the outer fiber layer (25) to the medial portion peripheral margin (42). The glaze layer (28) can, but need not necessarily, be disposed on the entirety of the exterior surface (6) of the one or the plurality of inner fiber layers (26). The glaze layer (28) can promote stiffness of medial portion (3) of the outer fiber layer (25) and of the one or plurality of inner fiber layers (26). The glaze layers (28) can have a substantially lesser thickness (48) than either of the plurality of inner fiber layers (26) and comprise a thin film (49) when applied by spray to the outer fiber layer (25) and inner fiber layers (26). The glaze layer (28) material can comprise or consist of: acrylic glaze, oil-based glaze, latex-based glaze, water-based glaze, a glaze coating such as KRYLON® Triple-Thick Crystal Clear Glaze available as Krylon Product Code 0500, or combinations thereof.

Again, referring primarily to FIGS. 5 and 6, in particular embodiments, a stiffener layer (31) can be disposed on the one or a plurality of the inner fiber layers (26). The stiffener layer (31) can extend to a stiffener layer periphery (50). The stiffener layer periphery (50) can, but need not necessarily, correspondingly extend to the one or a plurality of inner fiber layers periphery (37). The stiffener layer (31) can afford additional stiffness or rigidity to the medial portion (3) of the body (2) to aid in spanning or bridging a cavity (7) in the surface (6) without substantial deformation during application of the coat composition (12). As to particular embodiments, the stiffener layer (31) can be a solid stiffener layer (31) such as sheet metal having a metal gauge of about 25 to about 38 (about 0.25 mm to about 1.27 mm). As to particular embodiments, the stiffener layer (31) can be a mesh having a US Standard Mesh of about 12 to about 35 (about 0.25 mm to about 1.27 mm). The stiffener layer (31) can be selected from the group consisting of: metal, plastic, or ceramic, or combinations thereof.

Again, referring primarily to FIGS. 5 and 6, an intermediate adhesive layer (51) can be disposed between the stiffener layer (31) and the one or a plurality of inner fiber layers (26) to secure the stiffener layer (31) to the inner fiber layers (26) along with any other intermediate layers (52). The intermediate adhesive layer (51) can comprise any flexible adhesive which can secure the stiffener layer (31) to the inner fiber layers (26) and can comprise or consist of: latex-based adhesive, synthetic elastomeric polymer adhesive, polyvinyl acetate adhesive, 3M® General Purpose 45 Spray Adhesive available as 3M Product Code LN-A100-1898-7, or combinations thereof.

Figure 4:
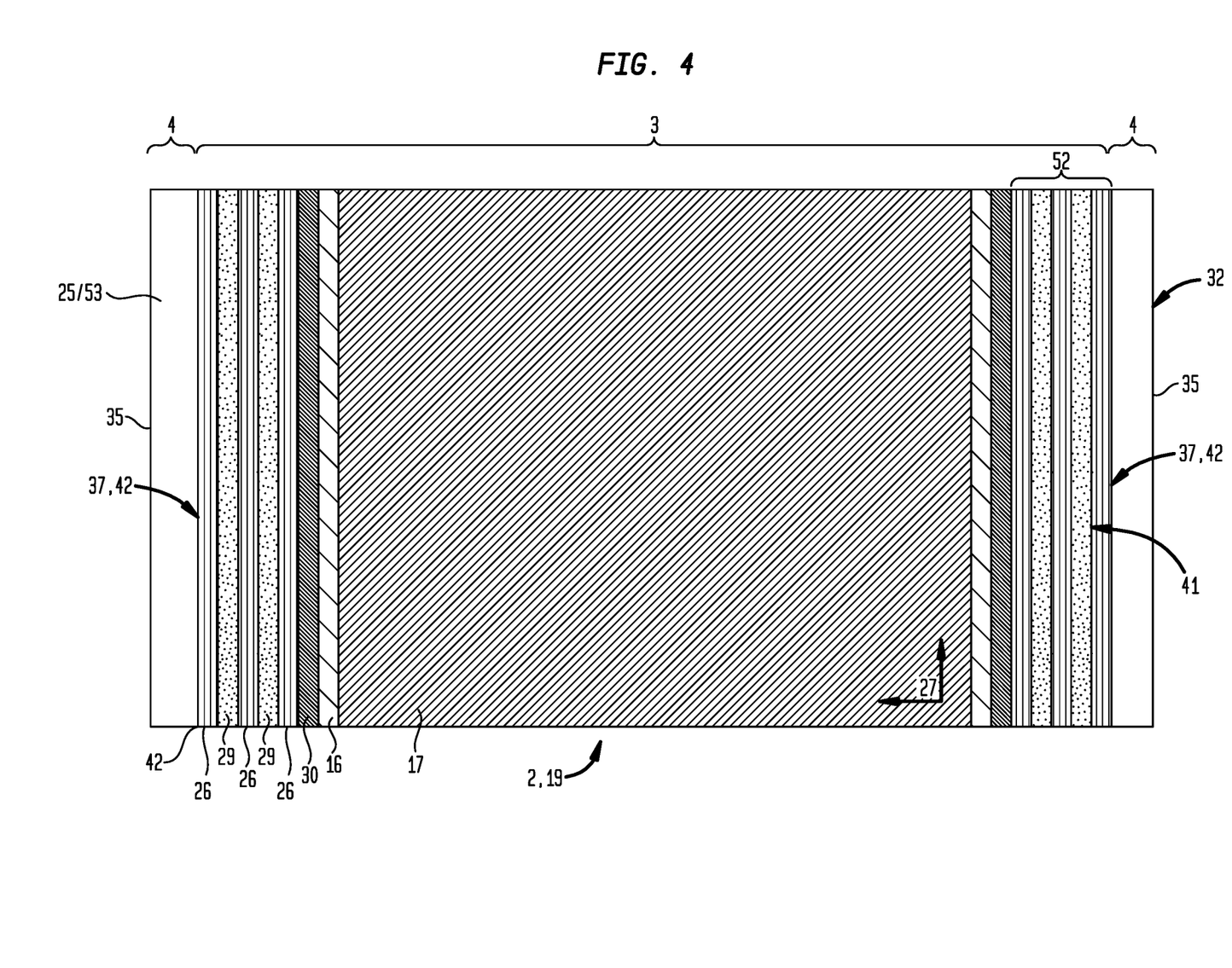
FIG. 4 is a bottom plan view of a particular embodiment of a multi-layered surface indentation concealment body.

Now referring to FIGS. 4 through 6, a particular exemplary embodiment of the body (2) can include the following plurality of layers (24). The outermost layer (53) from the surface (6) can be an outer fiber layer (25). The outer fiber layer (25) can extend to the outer fiber layer periphery (32). A first portion (54) of the outer fiber layer (25) corresponding to the medial portion inner surface (55) of the body (2) can be coated in a first glaze layer (28). Coupled to the first glaze layer can be a first inner fiber layer (56). The first inner fiber layer (56) can be coated in a second glaze layer (28). Coupled to the first inner fiber layer (56) can be a first intermediate elastomeric layer (58). Coupled to the first intermediate elastomeric layer (58) can be a second inner fiber layer (60). The second inner fiber layer (60) can be coated in a second glaze layer (28). Coupled to the second inner fiber layer (60) can be a second intermediate elastomeric layer (62). Coupled to the second intermediate elastomeric layer (62) can be a third inner fiber layer (64). The third inner fiber layer (64) can be coated in a third glaze layer (28). Coupled to the third inner fiber layer bottom surface (65) can be an intermediate adhesive layer (51). Coupled to the bottom surface (66) of the intermediate adhesive layer (51) can be a stiffener layer (31). Coupled to the stiffener layer bottom surface (67) can be an elastomeric layer (16). Coupled to the elastomeric layer bottom surface (68) can be an adhesive layer (17). For each successive inner fiber layer (26) from the outermost layer (53), the surface area (27) of each layer can progressively decrease, so that the surface area (69) of the third inner fiber layer (64) can be less than the surface area (70) of the first portion (54) of the outer fiber layer (25). The preceding description of this illustrative embodiment is not meant to preclude or obviate other embodiments of the body above described.

As can be easily understood from the foregoing, the basic concepts of the present invention may be embodied in a variety of ways. The invention involves numerous and varied embodiments of a multi-layered surface indentation concealment system and methods for making and using such multi-layered surface indentation concealment system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "layer" should be understood to encompass disclosure of the act of "layering"—whether explicitly discussed or not—and, conversely, were there effectively disclosure of the act of "layering", such a disclosure should be understood to encompass disclosure of a "layer" or even a "means for layering." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the multi-layered surface indentation system herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An apparatus, comprising:
   a body including:
      an outer fiber layer of a sheet of pressed together cellulose pulp, said outer fiber layer having a flexible peripheral margin; and
      a medial portion, including one or a plurality of inner fiber layers of sheet of pressed together cellulose pulp coupled to said outer fiber layer, said medial portion having a greater thickness than said outer fiber layer, said flexible peripheral margin of said outer fiber layer flexes in relation to said medial portion.

2. The apparatus of claim 1, wherein each successive one of said plurality of inner fiber layers covers a lesser surface area of said body.

3. The apparatus of claim 1, wherein said outer fiber layer has a first density and said plurality of inner fiber layers have a second density, said second density of said plurality of inner fiber layers greater than said first density of said outer fiber layer.

4. The apparatus of claim 1, further comprising one or more intermediate elastomeric layers disposed between one or more pairs of said plurality of inner fiber layers.

5. The apparatus of claim 4, wherein said intermediate elastomeric layer is selected from the group consisting of: natural rubber, resin, rubber cement, thermoplastic elastomers, nitrile rubber, silicone rubber, synthetic rubber, timprene, butyl rubber, and neoprene rubber, or combinations thereof.

6. The apparatus of claim 4, further comprising a glaze layer disposed on opposed surfaces of said outer fiber layer or on opposed surfaces of each of said plurality of inner fiber layers.

7. The apparatus of claim 6, wherein said glaze layer is selected from the group consisting of: acrylic glaze, oil-based glaze, latex-based glaze, water-based glaze, or combinations thereof.

8. The apparatus of claim 6, further comprising a stiffener layer, said stiffener layer comprised of a mesh stiffener layer or solid stiffener layer disposed on said plurality of inner fiber layers.

9. The apparatus of claim 8, wherein said mesh stiffener layer has a sieve mesh of about number 25 to about number 10 (about 0.25 millimeters to about 1.27 millimeters).

10. The apparatus of claim 8, wherein said solid stiffener layer and said mesh stiffener layer selected from the group consisting of: metal, plastic, or ceramic, or combinations thereof.

11. The apparatus of claim 8, further comprising an intermediate adhesive layer disposed between said mesh layer and said plurality of inner fiber layers.

12. The apparatus of claim 11, wherein said intermediate adhesive layer is selected from the group consisting of: latex-based adhesive, synthetic elastomeric polymer adhesive, polyvinyl acetate adhesive, or combinations thereof.

13. The apparatus of claim 11, further comprising an elastomeric layer disposed over said plurality of inner fiber layers.

14. The apparatus of claim 13, wherein said elastomeric layer is selected from the group consisting of: natural rubber, resin, rubber cement, thermoplastic elastomers, nitrile rubber, silicone rubber, synthetic rubber, timprene, butyl rubber, and neoprene rubber, or combinations thereof.

15. The apparatus of claim 13, wherein said adhesive layer is selected from the group consisting of: latex-based adhesive, synthetic elastomeric polymer adhesive, polyvinyl acetate adhesive, or combinations thereof.

16. The apparatus of claim 13, further comprising an adhesive layer engaged to said elastomeric layer.

17. The apparatus of claim 16, further comprising a peelable layer peelably secured to said adhesive layer.

18. The apparatus of claim 1, wherein said outer fiber layer comprises a fiber paper having a weight of 10 g/m$^2$.

19. The apparatus of claim 18, wherein said outer fiber layer comprises a rice paper.

20. The apparatus of claim 19, wherein said one or more inner fiber layers comprises a mulberry paper.

21. The apparatus of claim 1, wherein said one or said plurality of inner fiber layers comprises a fiber paper having a weight of 45 g/m$^2$.

22. The apparatus of claim 1, further comprising a stiffener layer having a stiffener layer first surface opposite a stiffener layer second surface, said stiffener layer first surface disposed on said one or said plurality of inner fiber layers, said stiffener layer comprises a mesh stiffener layer or solid stiffener layer.

23. The apparatus of claim 22, wherein said stiffener layer covers a lesser surface area of said medial portion than said one or said plurality of inner fiber layers.

24. The apparatus of claim 23, wherein said stiffener layer comprises a flexible plastic layer.

25. The apparatus of claim 22, further comprising an adhesive layer disposed on said stiffener layer second surface.

26. The apparatus of claim 25, further comprising a peelable layer peelably secured to said adhesive layer second surface.

27. The apparatus of claim 22, further comprising a coat composition disposable over said outer fiber layer subsequent to securement of said adhesive layer to a surface to conceal a surface indentation.

* * * * *